(12) United States Patent
Malott

(10) Patent No.: US 6,857,953 B2
(45) Date of Patent: Feb. 22, 2005

(54) RETURN AIR APPARATUS WITH DOWN DRAFT DIVERTER

(75) Inventor: Dale G. Malott, Middlebury, IN (US)

(73) Assignee: Dometic Corporation, Elkhart, IN (US)

( * ) Notice: Subject to any disclaimer, the term of this patent is extended or adjusted under 35 U.S.C. 154(b) by 0 days.

(21) Appl. No.: 10/725,675

(22) Filed: Dec. 2, 2003

(65) Prior Publication Data

US 2004/0127152 A1 Jul. 1, 2004

Related U.S. Application Data

(60) Provisional application No. 60/430,201, filed on Dec. 2, 2002.

(51) Int. Cl.[7] .................................................. B60H 1/00
(52) U.S. Cl. .......................... 454/100; 62/244; 62/412; 62/DIG. 16; 454/136
(58) Field of Search .......................... 454/99, 100, 136, 454/139, 140, 156, 158; 62/244, DIG. 16, 407, 412

(56) References Cited

U.S. PATENT DOCUMENTS

| | | | |
|---|---|---|---|
| 3,727,537 A | * | 4/1973 | Harty, Jr. ..................... 454/230 |
| 5,501,634 A | * | 3/1996 | Wilder ......................... 454/136 |
| 5,531,641 A | | 7/1996 | Aldrich ........................ 454/100 |

* cited by examiner

Primary Examiner—Harold Joyce
(74) Attorney, Agent, or Firm—Pearne & Gordon LLP

(57) ABSTRACT

A return air apparatus is provided with a ceiling template, which is mounted to an air comfort appliance unit at the ceiling of a recreational vehicle, a down draft diverter, a return air cover, and a return air grille. The ceiling template has a discharge opening and a return opening divided by an air barrier. The return air cover has a direct discharge opening and a return opening positioned below the ceiling template openings. The return air grille has a first section that communicates with the discharge opening of the ceiling template and a predetermined area of the interior of the recreational vehicle, and a second section that communicates with the return opening of the ceiling template and the interior of the recreational vehicle. A down draft diverter positioned in the air return cover and over the direct discharge opening of the air return cover allows air to be discharge directly through the discharge opening of the return air grille by creating an opening between the down draft diverter and the ceiling template.

20 Claims, 2 Drawing Sheets

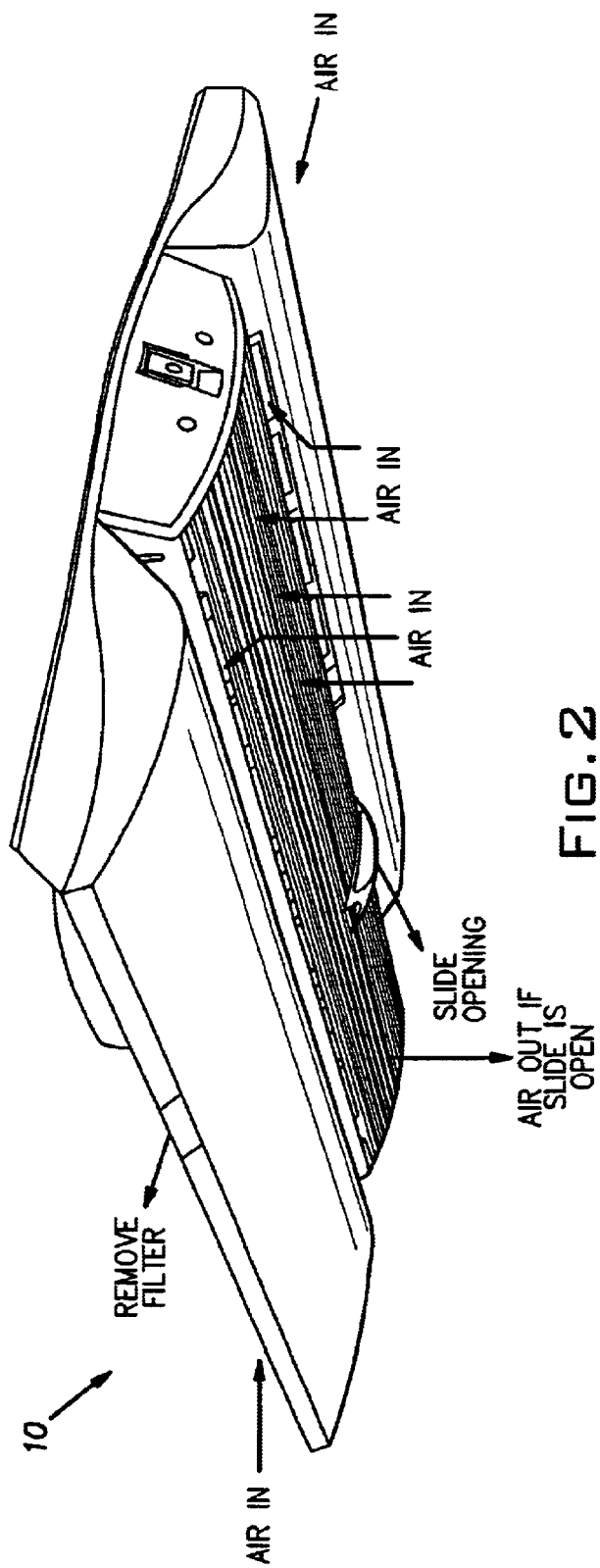

RETURN AIR APPARATUS WITH DOWN DRAFT DIVERTER

RELATED APPLICATION

This application claims the benefit of U.S. Provisonal Application No. 60/430,201, filed Dec. 2, 2002.

FIELD OF THE INVENTION

The present invention relates to a recreational vehicle with an air conditioning or heating system and, more particularly, to an air conditioning or heating system having a ceiling grille.

BACKGROUND OF THE INVENTION

Recreational vehicles, such as mobile homes, motor homes, campers, travel trailers, fifth wheelers, recreational vans, and other vehicles with an interior primary living space or area, commonly have air conditioning systems to provide cool dehumidified air to an interior of the recreational vehicle. The air conditioning system typically has a rooftop mounted air conditioning unit or heat pump unit and ducts for distributing the conditioned air. The conditioned air is discharged from the ducts into various area and/or rooms through registers.

U.S. Pat. No. 5,531,641, discloses a recreational vehicle with an air conditioner ceiling grille that includes a return air grille and a closable register. The register may be manually opened or closed by an operator to discharge air to the local area below the register.

SUMMARY OF THE INVENTION

The present invention provides a return air apparatus with a down draft diverter. The invention includes a direct discharge option, an improved air filtration system, and an improved installation with reduced steps. The invention is used with an air comfort control device or appliance unit that cools or refrigerates and/or heats air, such as an air conditioning unit or heat pump unit.

The invention allows for direct discharge of air from an appliance unit by opening and closing a ceiling template opening, rather than a grill louver. This yields reduced air outlet resistance and 100% air through the direct discharge option on the apparatus. The direct discharge option is opened and closed with a single action by a down draft diverter. The direct discharge option may also have a discharge opening with preset-opening percent detents allowing for partial air supply.

The improved air filtration system has two layers of electrostatic media. The filter is positioned to be remote from the grillwork to maximize the filter area and minimize air flow resistance. The filter position also allows the inlets to be separated throughout the return air cover without requiring filters on each opening in the cover. The improved installation has a tear-off air barrier, that is self-adhesive, self-sealing, and pre-cut forming. Hidden fasteners and the grillwork improve the visual appearance of apparatus. The invention may also include a dirty filter indicator that is resettable and a solar panel battery charging indicator option.

BRIEF DESCRIPTION OF THE DRAWINGS

Further features and details of the present invention will be apparent with reference to the following description and drawings.

FIG. 2 is a perspective view with designating air flow paths for the return air cover with return air grille and down draft diverter according to FIG. 1.

DETAILED DESCRIPTION OF THE INVENTION

Figure 1:
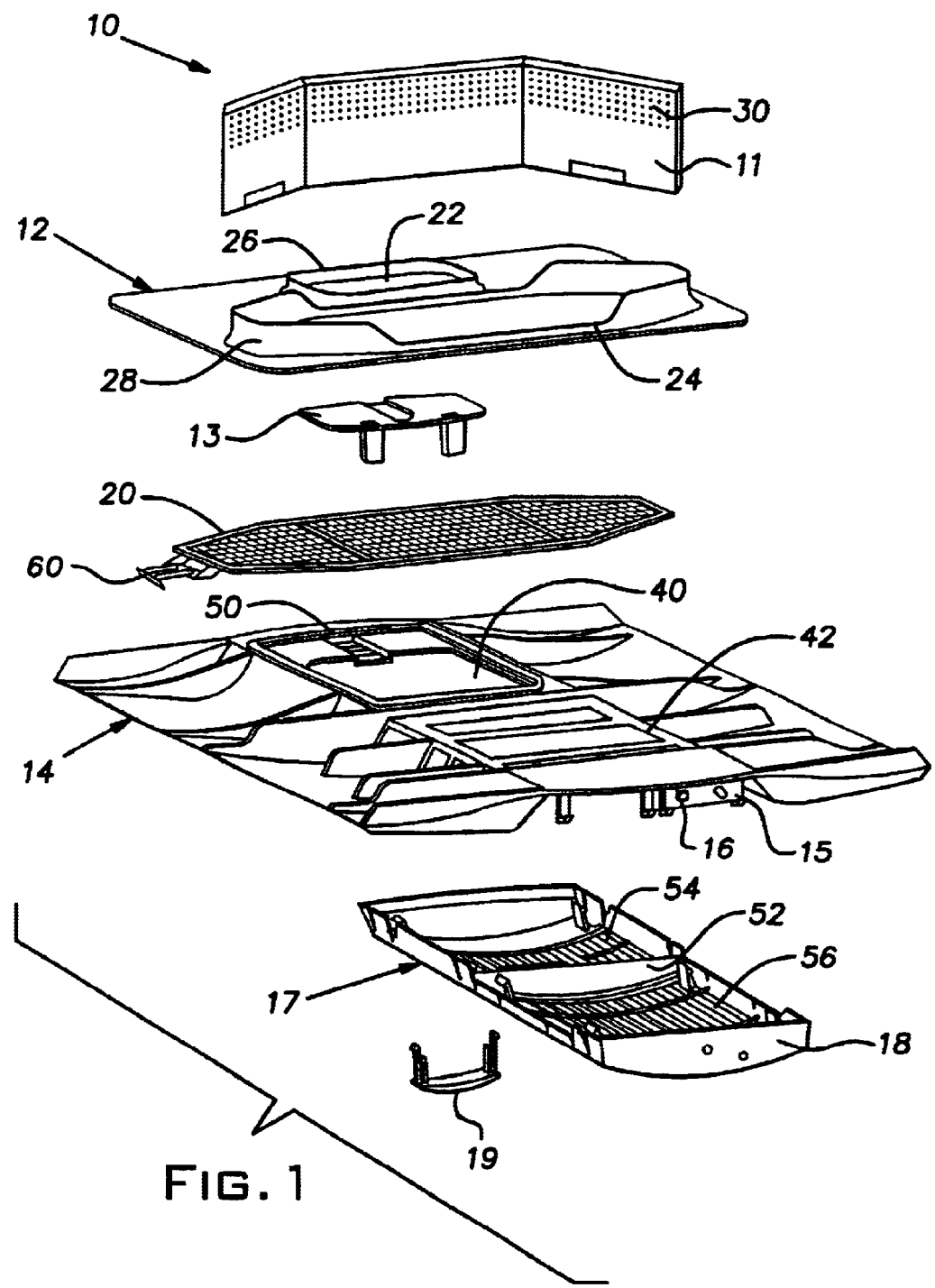
FIG. 1 is an exploded perspective view of a return air cover with return air grille and slide, ceiling template, air barrier, and filter.

FIGS. 1 and 2 shows an embodiment of the invention for use in a recreational vehicle having an air comfort control device or appliance unit that cools or refrigerates and/or heats air, such as an air conditioning unit or heat pump unit. The air comfort appliance unit is generally located over an opening in the recreational vehicle roof. There is also an opening in the ceiling of the recreational vehicle below the roof opening generally having the same dimensions as the roof opening. The openings are framed to form a plenum area below the air comfort appliance unit. The return air apparatus is located in the plenum area and over the opening in the ceiling.

As seen in FIG. 1, the return air apparatus 10 comprising an air barrier 11, a ceiling template 12, a down draft diverter 13, a return air cover 14, circuit boards 15, a return air grille 17, a decorative cover 18, a slide handle 19, a filter 20, and miscellaneous fasteners, insulation, and plastic parts. The ceiling template 12 is located at the ceiling of the recreational vehicle below the ceiling opening. The ceiling template 12 includes a discharge opening 22 and a return opening 24. A first flange 26 extends upwardly from the top surface of the ceiling template forming an upwardly extending wall around the perimeter of the discharge opening 22. A second flange 28 extends upwardly from the top surface of the ceiling template from an upwardly extending wall around the perimeter of the return opening 24. The ceiling template 12 includes bolt openings so that bolts can attach the ceiling template to the air comfort appliance unit. The ceiling template 12 may also have insulation where needed to properly fit or seal the ceiling template within the ceiling opening. The ceiling template 12 should be made of a material having adequate strength to support the loads required to mount the appliance unit, such as, for example, steel sheet.

The air barrier 11 is formed to conform with a side of the second flange 28 of the return opening 24 that is adjacent to the discharge opening 22. The air barrier 11 extends from the ceiling template 12 to the air comfort appliance unit to divide and seal the plenum area between the ceiling template and air comfort appliance unit into a discharge section and a return section. The discharge section is in communication with an outlet of the air comfort appliance unit, and the return section is in communication with an inlet of the air comfort appliance unit The air barrier 11 has perforated sections 30, which provide tear-off strips to allow sizing for various depth ceilings, and is self-sealing to the air comfort appliance unit. Tape may be required to seal the ends of the air barrier 11 to the ceiling opening, however, the seal between the air barrier 11 and the air comfort appliance unit is by compression of the barrier material. The air barrier 11 is preferably made of a stiff, compressible insulating material.

The return air cover 14 is the aesthetically main viewed component of the apparatus. The return air cover 14 is located at the ceiling below the ceiling template 12 and conceals the ceiling template 12 when installed. The return air cover 14 has a generally rectangularly-shaped panel with a cavity housing other plastic and circuit board components. The return air cover 14 also includes a direct discharge opening 40 and a return opening 42, which are located below the discharge opening 22 and return opening 24 of the ceiling template 12, respectively, when the return air cover 14 is mounted to the ceiling template 12. The return air cover 14 is attached to the ceiling template 12 with standard fasteners or, alternately, snap locks. The return air cover 14 may also be attached by other known fastening means. The return air cover 14 is preferably molded of a plastic material.

A down draft diverter or slide 13 is positioned in the air return cover 14 over the direct discharge opening 40 of the air return cover 14. The slide 13 is positionable to allow adjustment to any degree of openness of the discharge section 40 with a single action or motion. The slide 13 may have a rib (not shown) on one surface that interacts with mating grooves 50 spaced in the return air cover in intervals to preset or create desirable detent stop positions. The detent stop positions allow an operator to set the discharge section in predetermined degrees of openness, such as, for example, full closed, one-fourth, one-half, and full open. The slide 3 is preferably molded of a plastic material.

The return air grille 17 is attached to the return air cover opening. The return air grille extends across the direct discharge opening 22 and return opening 24 of the return air cover. The return air grille 17 is snapped into place on the return air cover 14 by latches molded into both the return air grille 17 and the return air cover 14. The return air grille 17 may also be attached to the return air cover by other known fastening means. The return air grille 17 is preferably molded of a plastic material.

A divider flange 52 divides the return air grille 17 into first and second sections 54, 56. The first section 54 is located below the discharge opening 22 of the return air cover 14. The first section 54 communicates the discharge portion of the plenum area with the interior of the recreational vehicle so that air can be discharged into the recreational vehicle directly below the air comfort appliance unit. The second section 56 is located below the return opening of the return air cover 14. The second section 56 communicates the return portion of the plenum area with the interior of the recreational vehicle, so that air can be returned to the air comfort appliance unit.

The slide handle 19 is inserted through an opening (not shown) in the return air grille 17 and is snapped into the slide 13. The slide handle 19 provides a grip for the operator to move the slide 13 with a single action or motion. The slide handle 19 is preferably molded of a plastic material.

The filter 20 is located over the return opening 24 in the return air cover 14 to improve air quality to the air comfort appliance unit and prevent dirt accumulation on surfaces of the air comfort appliance unit. The filter 20 has a filter pull tab 60 located at one end to remove and replace the filter without tools. The filter 20 may be installed between guides in the cover and into a receiving channel until a detent tab engages and holds the filter position in the cover. The filter pull tab may also be stopped by protrusions on the cover. The filter 20 is positioned remote from the return air grille 17 to maximize filter area and to minimize air flow resistance. The filter 20 position also allows inlets to be separated throughout the return air cover 14 without requiring filters on each opening in the return air cover. The filter 20 is preferably a combination of two layers of electrostatic media molded into a plastic frame.

The circuit boards 15, 16 are mounted in the return air cover indicating functions for the operator. A decorative cover 8 installed on the cover may also indicate operation of the circuit boards. One circuit board 15 indicates to the operator when it is time to replace the filter. The filter indicator is turned off by pushing on the face of the decal decorative cover in a manner similar to activation of a pressure switch. The indicator is preferably a simple timer that activates a light after a predetermined period of days since the timer was last reset. The second circuit board 16 is an indicator that a solar panel is charging the vehicle battery. It has no operator interface, but indicates with a light when the solar panel, if installed, is charging. The circuit boards can be supplied standard with the apparatus or installed to the return air cover. The circuit boards can also be supplied as aftermarket accessories.

The invention can be installed in a vehicle with a new appliance unit, such as an air conditioner unit or heat pump unit, or to an existing model appliance unit, which was prepared and positioned for installation with standard procedures. The air barrier 11 is torn to size along the appropriate perforated sections 30, the tape liner is then removed, and the barrier is folded and adhered to the ceiling template 12. Electric controls can be installed to the ceiling template 12 or, alternately, are mounted elsewhere. The ceiling template 12 is inserted into the ceiling opening of the vehicle into an installation position and then attached to the appliance unit with bolts through existing holes in the ceiling template and into the appliance unit. Tape may be required to seal the ends of the air barrier to the vehicle cavity. The seal to the appliance unit is by compression of the barrier material.

The slide 13 is positioned in the return air cover 14, and both the slide and cover are placed in position over the ceiling template 12. The return air cover 14 is then attached to the ceiling template 12. The wiring may then be connected attaching the circuit boards to the vehicle power sources. The return grille 17 is snapped into place on the return air cover 14, and the slide handle 19 is inserted through appropriate opening in the grille and snapped into the slide. Finally, the filter 20 is installed between the return air cover 14 and ceiling template 12.

The apparatus may be operated with existing thermostats calling for air circulation, with or with cooling or heating, and in conjunction with an existing model air conditioner unit or heat pump unit. FIG. 2 shows the air flow paths for the return air cover with return air grille and slide. Return air enters the apparatus through openings in the return air grille 17, through openings in the return air cover 14, and through openings between return air cover 14 and the interior vehicle surface (not shown). During operation, air is normally discharged by the air comfort appliance unit into the roof or wall cavity and into duct work in the vehicle, or directly into duct work. Air can also be diverted down and discharged directly through the discharge opening of the return air grille 17, by moving the slide 13 in the return air cover 14. This creates an opening between the slide 13 and the ceiling template 12 from which the air can escape through. The direct discharge option of opening and closing a ceiling template opening, rather than a grill louver, yields reduced air outlet resistance and 100% air through the discharge opening on the apparatus. The direct discharge option may also use a discharge opening with preset-opening percent detents allowing for partial air supply.

While the invention has been described with reference to a specific embodiment, various changes may be made and equivalents may be substituted for elements thereof by those skilled in the art without departing from the scope of the invention. In addition, other modifications may be made to adapt a particular situation or method to the teachings of the invention without departing from the essential scope thereof.

What is claimed is:

1. A return air apparatus for use with an air comfort appliance unit comprising:
   a ceiling template adapted to be mounted to the air comfort appliance unit at a ceiling of a recreational vehicle at a position spaced from the air comfort appliance unit to form a plenum area between the ceiling template and the air comfort appliance unit, the ceiling template having a discharge opening and a return opening,
   an air barrier extending from the ceiling template to divide a plenum area between the ceiling template and the air comfort appliance unit into a discharge section and a return section,
   a return air cover with a direct discharge opening positioned below the discharge opening of the ceiling template, and a return opening positioned below the return opening of the ceiling template,
   a down draft diverter positioned in the return air cover over the direct discharge opening of the return air cover, and
   a return air grille with a first section positioned to communicate with the discharge opening of the ceiling template and a predetermined area of the interior of the recreational vehicle, and a second section positioned to communicate with the return opening of the ceiling template and the interior of the recreational vehicle, the first section of the return air grille including a first area in communication with the direct discharge opening of the return air cover, the second section of the return air grille including a second area in communication with the return opening of the return air cover, and the return air grille further including a divider flange dividing the first area from the second area,
   wherein the down draft diverter is adapted to be moved with respect to the ceiling template to create an opening between the down draft diverter and the ceiling template such that air can be discharged directly through the direct discharge opening of the return air cover.

2. The return air apparatus of claim 1, wherein, in use, air may be drawn through the second section in the return air grille, through the return opening in the return air cover, and then through the return opening in the ceiling template.

3. The return air apparatus of claim 1, further comprising:
   a filter positioned between the return opening of the ceiling template and the return opening of the return air cover,
   wherein said filter is positioned remote from the return air grille to maximize filter area and minimize air flow resistance.

4. The return air apparatus of claim 1, wherein the return air cover includes grooves spaced in interval that are adapted to interact with the down draft diverter to facilitate maintenance of an opening between the down draft diverter and the ceiling template at predetermined degrees of openness.

5. The return air apparatus of claim 1, wherein the air barrier includes perforated sections providing tear off strips to allow sizing for various depth ceilings, and wherein the air barrier is adapted for self-sealing to the air comfort appliance unit.

6. The return air apparatus of claim 1, further comprising:
   circuit boards mounted in the return air cover for a filter indicator that indicates when to replace the filter and a solar panel battery charging indicator that indicates when a solar panel is charging.

7. The return air apparatus of claim 1, further comprising a handle including a portion extending adjacent an outer area of the first section of the return air grille.

8. The return air apparatus of claim 7, wherein the portion of the handle is connected to the down draft diverter through the first section of the return air grille and through the direct discharge opening of the return air cover.

9. The return air apparatus of claim 1, wherein the down draft diverter comprises a slide adapted to translate relative to the return air cover.

10. The return air apparatus of claim 9, further comprising a handle including a portion extending adjacent an outer area of the first section of the return air grille, wherein the portion of the handle is adapted to move relative to the first section of the return air grille in order to translate the slide relative to the return air cover.

11. The return air apparatus of claim 10, wherein the portion of the handle is connected to the down draft diverter through the first section of the return air grille and through the direct discharge opening of the return air cover.

12. The return air apparatus of claim 1, wherein the portion of the handle is adapted to translate adjacent the first section of the return air grille in order to translate the slide relative to the return air cover.

13. The return air apparatus of claim 3, wherein the return opening of the return air cover is located between the filter and the second section of the return air grille.

14. A return air apparatus for use with an air comfort appliance unit comprising:
   a ceiling template adapted to be mounted to the air comfort appliance unit at a ceiling of a recreational vehicle at a position spaced from the air comfort appliance unit to form a plenum area between the ceiling template and the air comfort appliance unit, the ceiling template having a discharge opening and a return opening,
   an air barrier extending from the ceiling template to divide a plenum area between the ceiling template and the air comfort appliance unit into a discharge section and a return section,
   a return air cover with a direct discharge opening positioned below the discharge opening of the ceiling template, and a return opening positioned below the return opening of the ceiling template,
   a down draft diverter positioned in the return air cover over the direct discharge opening of the return air cover,
   a return air grille with a first section positioned to communicate with the discharge opening of the ceiling template and a predetermined area of the interior of the recreational vehicle, and a second section positioned to communicate with the return opening of the ceiling template and the interior of the recreational vehicle, and
   a filter positioned between the return opening of ceiling template and the return opening of the return air cover, wherein the filter is positioned remote from the return air grille to maximize filter area and minimize air flow resistance,
   wherein, in use, air may be drawn through the second section in the return air grille, through the return opening in the return air cover, through the filter, and then through the return opening in the ceiling template,
   wherein the down draft diverted diverter is adapted to be moved with respect to the ceiling template to create an opening between the down draft diverter and the ceiling template such that air can be discharged directly through the direct discharge opening of the return air cover.

15. The return air apparatus of claim 14, wherein the return air cover includes grooves spaced in interval that are adapted to interact with the down draft diverter to facilitate maintenance of an opening between the down draft diverter and the ceiling template at predetermined degrees of openness.

16. The return air apparatus of claim 14, wherein the air barrier includes perforated sections providing tear off strips to allow sizing for various depth ceilings, and wherein the air barrier is adapted for self-sealing to the air comfort appliance unit.

17. The return air apparatus of claim 14, wherein the return opening of the return air cover is located between the filter and the second section of the return air grille.

18. The return air apparatus of claim 14, wherein the first section of the return air grille is attached to the second section of the return air grille.

19. The return air apparatus of claim 14, wherein the first section of the return air grille comprises a first area in communication with the direct discharge opening of the return air cover, the second section of the return air grille comprises a second area in communication with the return opening of the return air cover, and wherein the return air grille further comprises a divider flange dividing the first area from the second area.

20. A return air apparatus for use with an air comfort appliance unit comprising:

a ceiling template adapted to be mounted to the air comfort appliance unit at a ceiling of a recreational vehicle at a position spaced from the air comfort appliance unit to form a plenum-area between the ceiling template and the air comfort appliance unit, the ceiling template having a discharge opening and a return opening, an air barrier extending from the ceiling template to divide a plenum area between the ceiling template and an air comfort appliance unit into a discharge section and a return section, a return air cover with a direct discharge opening positioned below the discharge opening of the ceiling template, and a return opening positioned below the return opening of the ceiling template, a slide positioned in the return air cover over the direct discharge opening of the return air cover, and a return air grille with a first section positioned to communicate with the discharge opening of the ceiling template and a predetermined area of the interior of the recreational vehicle, and a second section positioned to communicate with the return opening of the ceiling template and the interior of the recreational vehicle, wherein the slide is adapted to translate with respect to the return air cover to create an opening between the slide and the ceiling template such that air can be discharged directly through the direct discharge opening of the return air cover and wherein the slide is adapted to interact with the return air cover to facilitate maintenance of the opening between the slide and the ceiling template at predetermined degrees of openness.

* * * * *

UNITED STATES PATENT AND TRADEMARK OFFICE
CERTIFICATE OF CORRECTION

PATENT NO. : 6,857,953 B2
DATED : February 22, 2005
INVENTOR(S) : Dale G. Malott It is certified that error appears in the above-identified patent and that said Letters Patent is hereby corrected as shown below:

Column 1,
Line 62, please delete "diverted".

Signed and Sealed this

Twenty-third Day of August, 2005

JON W. DUDAS
*Director of the United States Patent and Trademark Office*